United States Patent [19]

Schaap et al.

[11] 4,355,048
[45] Oct. 19, 1982

[54] MANUFACTURE OF SEMI-HARD CHEESE BY ULTRAFILTRATION

[75] Inventors: Johannes E. Schaap, Lunteren; Paulus F. C. Nooy, Bennekom; Rudolf De Boer, Wageningen, all of Netherlands

[73] Assignee: Stichting Bedrijven Van Het Nederlands Instituut voor Zuivelonderzoek, Ede, Netherlands

[21] Appl. No.: 262,637

[22] Filed: May 11, 1981

Related U.S. Application Data

[63] Continuation of Ser. No. 65,847, Aug. 13, 1978, abandoned.

[30] Foreign Application Priority Data

Aug. 14, 1978 [NL] Netherlands .......................... 7808432

[51] Int. Cl.$^3$ ..................... A23C 19/028; A23C 19/05
[52] U.S. Cl. ...................................... 426/40; 426/43; 426/491
[58] Field of Search ..................... 426/36, 39, 40, 491, 426/582, 43

[56] References Cited

U.S. PATENT DOCUMENTS

| | | | |
|---|---|---|---|
| 3,914,435 | 10/1975 | Maubois et al. | 426/40 |
| 3,963,837 | 6/1976 | Maubois et al. | 426/40 |
| 4,018,752 | 4/1977 | Buhler et al. | 426/36 X |
| 4,110,484 | 8/1974 | Rule et al. | 426/582 |
| 4,131,688 | 12/1978 | Grosclaude et al. | 426/40 |

FOREIGN PATENT DOCUMENTS 990219 6/1976 Canada .
2211737 3/1972 Fed. Rep. of Germany .
1438533 6/1976 United Kingdom .

OTHER PUBLICATIONS

Covacevich et al., Mozzarella and Cheddar Cheese Manufacture by Ultra-filtration Principles, T. Da. Sci., vol. 61, 1978, (pp. 701–709).

Ernstrom et al., Ultrafiltration of Whole Milk for the Manufacture of Curd for Processing, J. Dairy Science Supp., 73rd Annual Meeting, Jul. 9–13, 1978, N. 698, (pp. 102–103).

Hansen, R., Feda Cheese Production by Ultrafiltration, North European Dairy Journal, vol. 9, 1977, (pp. 304–310).

Kosikowski, F., Cheese and Fermented Milk Foods, Printed and Distributed by Edwards Brothers, Inc., Ann Arbor, Michigan, 2nd Ed. 1977, (pp. 510–516 and 668).

Maubois et al., Application of Membrane Ultrafiltration to Preparation of Various Types of Cheese, J. Da. Sci., vol. 58, No. 7, 1975, (pp. 1001–1007).

Porter et al., Membrane Ultrafiltration, Chem. Tech. Tan. 1972, (pp. 56–61).

Primary Examiner—David M. Naff
Attorney, Agent, or Firm—Fleit & Jacobson

[57] ABSTRACT

Semi-hard cheese such as Gouda and Edam is produced by subjecting skimmilk to a first stage ultrafiltration, a second stage diafiltration and a third stage ultrafiltration, adding fat to the resultant concentrate, mixing and cooling the resultant fat-containing concentrate in a first scraped heat exchanger, adding additives for making cheese such as rennet and starter, passing the resultant mixture to a second scraped heat exchanger and placing the mixture in molds to form cheese.

4 Claims, No Drawings

MANUFACTURE OF SEMI-HARD CHEESE BY ULTRAFILTRATION

This is a continuation of Ser. No. 065,847, filed Aug. 13, 1979, now abandoned.

When manufacturing cheese by conventional methods, part of the milk protein is lost in the whey which is withdrawn during the cheesemaking. When the whey proteins have been made undissolvable by denaturation, e.g. by means of excessive heat treatment of milk, they can be absorbed in the cheese. However, in this way, the organoleptic properties of cheese are severely affected in the negative sense. In order to cut down the loss of protein without denaturating the whey proteins, cheese manufacture should be adapted in such a way that little or no whey needs to be drained off. In order to obtain a cheese of the composition desired, part of the serum should, in any case, be removed from the original milk. In principle, ultrafiltration (UF) is a technique which, for this purpose, can be applied to advantage.

Dutch Patent Application No. 70,10656 describes the use of UF in the manufacture of Camembert, a soft cheese with a moisture content of approx. 55%. According to said patent application the protein concentrate in the skimmilk used should be increased by a factor of approx. 5; Camembert can be made from a mixture of UF-concentrate and cream, in which the whey proteins are absorbed nearly quantitatively.

German Patent Application No. 2,211,737 describes a variant of the aforementioned process; the concentrate obtained from skimmilk after UF and DF (diafiltration) is concentrated by evaporation until the desired composition (16.2% protein, 4.0% lactose and 1.4% ash) is obtained.

In order to avoid problems as to structure with the Camembert made from the UF-concentrate, Dutch Patent Application No. 76,07821 suggests the use of mucor-producing bacteria.

Recently, attempts were reported by which a type of cheese other than Camembert was manufactured with the aid of UF. Thus, Feta-cheese was made from milk which was standardized to fat and subsequently subjected to UF (Nord. Europ. Mej. Tidsskr. (1977) (9) 304). The concentrate contained 39.5% solids, 17.8% fat and 16.4% protein. The concentrate was maintained at a temperature of 77° C. for one minute to reduce the exudation of whey at a later stage and to influence the structure of the cheese. After homogenization of the concentrate an almost white cheese was obtained.

The manufacture of Herve-cheese with the aid of UF is discussed in the annual report 1976 of the Belgian Rijkszuivelstation at Melle. With the aid of a homogenizer, butter oil was distributed in the UF-concentrate of skimmilk; the solids content of the mixture was between 34.5 and 38.5%. The cheese thus obtained did not have the characteristic sharp Hervetaste and it had a slightly bitter "after taste".

The compositions of the types of cheese (Camembert and Feta, both with a moisture content of approx. 55%) made so far on industrial scale with the aid of UF differ considerably from the compositions of the semi hard varieties such as the Gouda and Edam (moisture content approx. 42%). However, when making the two varieties last mentioned, the protein component should not be concentrated five times but approximately nine times.

A concentration of this kind is being suggested in Dutch Patent Application No. 74,03735. Said application deals with a method for adjusting the lactose content of the skimmed milk concentrate in order to make it appropriate for the manufacture of various types of cheese, a.o. the Gouda and Edam variety. According to said method, concentration is carried out with the aid of UF until a specific percentage of the original volume has been attained, whereupon water or an aqueous salt solution is added to the concentrate and the diluted concentrate is again subjected to UF. In so doing, a lactose content of 1.6 to 5.1% can be adjusted. According to the examples, a concentrate might be obtained, showing the following composition: 32.8% solids-non-fat, 27.8% protein, 2.3% lactose and 2.7% ash. It is, however, surprising that no process temperature is mentioned in said application, although UF has to be carried out at an elevated temperature in order to obtain a concentrate with such a high protein content. Even at an elevated process temperature —55° C. at the end of the process-experts of Statens Forsøgsmejeri in Denmark (226. Beretning) obtained a maximum percentage of 25.9 solids and 18.8 protein with the new version of the apparatus described in said patent application. The examples stated in the application do not disclose the manufacture of cheese and do not mention the type of cheese being made. Consequently, one might have doubts as to the value of these examples. The 17 varieties of cheese mentioned in the application differ so much in composition, odour, flavour, consistency and in the method of manufacture which leads to their characteristic features that it is not possible to speak of manufacture of cheese in general. The application does not give any information on the question whether with the concentrated skimmilk semi-hard cheeses, like the Gouda and Edam type, can actually be made.

Covacevich und Kosikowski (J. Dairy Sci. 61 (1978) 701) succeeded in making a Cheddar cheese with the aid of UF; the solids content required in the UF concentrate, however, could only be obtained by adding a dried UF concentrate to a liquid concentrate.

As is apparent from the aforegoing, various problems have to be overcome in order to be able to make harder types of cheese with the aid of UF. Such problems include the attaining of high solids contents which is required—many experts consider approx. 20% protein as the maximum attainable percentage—and other problems relate to the characteristics of the final product: cheese.

When manufacturing the Gouda and Edam cheese a UF concentrate has to be obtained from skimmed milk, which contains 27 to 28% protein, 1.8 to 2.0% lactose and at least 31.5% solids, i.e. a high protein content and a comparatively low lactose content. In the case of a lower solids content of the concentrate, the consistency of e.g. the Gouda and Edam variety becomes pasty; the lactose content is highly important for the desired pH and, thus, for the structure of the cheese.

Surprisingly, it was found that with the method according to the invention, UF concentrates can be obtained which meet the aforementioned requirements and from which semi-hard cheese varieties, such as Gouda and Edam can be made. It was also surprising that full-cream Gouda made with the aid of UF showed a consistency which is comparable with cheese made by conventional methods, in which a smooth dairy produce and a creamy flavour became prominent. The consistency of cheese having a fat content of 20%, the so-called "20+" cheese variety, made with the aid of UF according to the invention was considerably improved as compared to the consistency of the cheese made according to the conventional method.

Other advantages of the method according to the invention are: a higher yield, a flexible system and accurate control of the weight of the cheese.

In order to make the process technically feasible, it is at least partly carried out at an elevated temperature, preferably between 50° and 55° C., so that the flux to be obtained is increased and, particularly, the viscosity of the concentrate is kept low. At higher temperatures, the viscosity may be increased as a result of denaturation of the whey protein and, in addition, the quality of the cheese is negatively effected.

The lactose content which is required for the pH desired in the cheese may be adjusted e.g. by diafiltration of the UF concentrate. DF of the final concentrate is difficult because of the high viscosity and is, therefore, preferably carried out when a decrease in volume by UF of approx. 70% has been attained. In many cases, 55% of water, related to the concentrate volume, is sufficient for properly carrying out the DF-process. Until this stage, the process can be carried out in a continuous system. It is recommended that further concentration by UF be carried out in a batch system because of the low capacities of the membrane apparatus at these high protein contents. In view of the high viscosity of the concentrate, even at 50° to 55° C., tubular membranes need to be used to maintain proper turbulence in the liquid, whereby the high concentration factor desired of approx. 9 can be obtained. Accurate control of such thorough concentration is highly important; the solids content obtained determines to a high degree the quality of the final product. In order to obtain the fat content in the solids of the cheese variety desired, fat should be added to the UF concentrate of skimmilk. When, for this purpose, standardized milk would be subjected to UF, the fat globules would be damaged severely by the highly intensive UF treatment. During ultrafiltration of whole milk, the average size of the globules was reduced to one third of the original size in 45 minutes; the spreading in size increased by a factor of three. In this test, the last part of the concentration process was carried out in a batch system. The consequence of the damage is that the final product obtains a gritty structure and that in the case of e.g. the Gouda and Edam type undesirable hydrolysis of the fat may occur. The phenomenon of a gritty structure and of undesirable hydrolysis of the fat due to damage of the fat globules is also found in the conventional manufacture of Gouda cheese from homogenized milk.

In order to maintain the effect of thorough concentration, the amount of water to be added to the UF concentrate along with the fat should be kept at a minimum. Thus, for making full-cream cheese, one should start from anhydrous milk fat; for cheese with a fat content of 20%, the so-called "20+" variety, also highly rich cream (with a fat content of at least 70%) can be used. When making filled cheese the milk fat can be substituted by vegetable fat.

It was found that the structure of the final product depends on the way in which the fat and the UF concentrate, to which nitrate and calcium chloride may have been added, are being mixed. As is known, the structure is an important criterium for the quality of the semi-hard cheese varieties. Mixing may take place e.g. in a scraped heat exchanger; on the one hand, the fat is properly distributed in the UF concentrate and, on the other hand, the mixture is cooled until the temperature desired has been attained. The temperature plays an important part in the curdling and in the initiation of a proper acidification and will generally lie around 32° C.

In order to avoid faults in the structure, such as "motley", "gritty" or "too soft" the capacity and velocity of the knives of the scraped heat exchanger are accurately adjusted. During tests, A Schröder Kombinator was used; with a capacity of 60 kg of mixture per hour and 400 r.p.m. of the knives, products with a proper structure were obtained. In order to prevent the development of pin holes in the cheese, air inclusion during the last part of the UF process and during the mixing of concentrate and fat should carefully be avoided.

As in the case of cheesemaking according to conventional methods, the starter, rennet and, if desired, other additives, such as salt or herbs are added. The additives may be added "on line" to the concentrate-fat-mixture between the aforementioned heat exchanger and the next mixer.

One advantage of cheesemaking with the aid of UF is that salt may be added which does not enter the whey. By adding 0.5% salt, a dose with which the activity of the starter and the structure of the product are not unacceptably affected, the brine-time needed for 1 kg of Baby Gouda cheese is reduced to one third of the usual time period.

When the starter is added, dilution of the mixture thus obtained should be reduced as much as possible. This can be achieved by using starter concentrates (dose approx. 0.25%). Before being added, starters cultivated in the usual way are concentrated by a factor of four, preferably with the aid of UF, in which case the dose will be approx. 2.5%.

In order to guarantee proper mixing of the rennet through the mixture of cream or fat and UF concentrate, a slight dilution of the usual rennet solution (concentration approx. 10,000 units) is advisable. A dose of 1.1 ml of a 1:1 dilution of rennet solution per kg mixture yields good results and the effect of dilution on the whole bulk is neglectible.

In view of the high viscosity of the mixture, high demands are made on the distribution of said additives in the mixture of UF concentrate and fat or cream. During experiments use was made of a second scraped heat exchanger (Schröder Kombinator), in which the heat produced during the mixing process can be removed. Just before the mixture of UF concentrate and fat or cream enters the second mixer, the aforementioned additives are added "on line" to the product flow. In the experiments, the capacity and knife-velocity of the second mixer were the same as those of the first mixer.

The still liquid product flow is removed behind the second mixer and collected in the molds desired; in doing so, air inclusion should be avoided. During the drainage of the mass the weight of the cheese can accurately be controlled. The product is then kept at the usual renneting temperature (approx. 30° C.) for half an hour; subsequently, the moulding of the cheese is continued by means of a slight pressing (e.g. 430 g/cm$^2$ during 5 minutes for 1 kg of Baby Gouda) which has also a favourable effect on the forming of the rind.

The further process as to holding time, brining and ripening is analogous to the conventional method of cheesemaking, with the exception that due to the addition of salt to the mixture before it enters the second mixer the time of brining can be shortened.

The process described above is illustrated by the following diagram which has been used for making cheeses of 1 kg, i.e. for the Gouda full-cream variety and for the 20+ variety (20% fat):

```
SKIMMILK      ultrafiltration
74° C./10"    diafiltration      UF CON-
              ultrafiltration    CENTRATE
                                       calcium chloride
                                       sodium nitrate
              MILK FAT
                      HEAT EXCHANGER / MIXER I
              rennet                  starter
                                      concentrate
                      MIXER II
                      filling on weight
                      30' curdling
                      5' pressing
                      8 hours holding time
                      "20+": 9 hours
                      brining
                      full-cream: 16 hours
CHEESE READY FOR      ripening(13–14° C.; 90% relative
                      moisture)
```

CONSUMPTION

During the cheesemaking of the "20+" (20% fat) variety and of the full-cream variety according to the above diagram, a.o. the following data were obtained:

|  | 20+ | full-cream |
|---|---|---|
| SKIMMILK ULTRAFILTRATE | | |
| % solids | 32.3 | 31.7 |
| % lactose | 1.82 | 1.80 |
| % protein | 27.5 | 27.1 |
| MIXTURE DURING FILLING | | |
| % solids | 37.7 | 48.3 |
| % fat on solids | 20.1 | 49.6 |
| pH after 12 hours | 5.25 | 5.22 |
| after 4 weeks | | |
| % moisture | 47.6 | 39.8 |
| % salt on solids | 4.7 | 3.8 |
| pH | 5.48 | 5.33 |

We claim:

1. A method of manufacturing semi-hard cheese from skimmilk comprising:
  (a) continuously feeding skimmilk to a first stage ultrafiltration whereby a first ultrafiltration concentrate is obtained;
  (b) subjecting the first ultrafiltration concentrate to a second stage diafiltration until a diafiltration concentrate is obtained having a lactose content between 1.8% and 2.0%;
  (c) subjecting the diafiltration concentrate to a third stage ultrafiltration carried out batchwise with tubular membranes at a temperature between about 50° C. and 55° C.;
  (d) recovering a second ultrafiltration concentrate containing at least 31.5% solids, between about 27% to about 28% protein and between about 1.8% to 2.0% lactose;
  (e) adding fat to the second ultrafiltration concentrate;
  (f) mixing and cooling the combined fat and ultrafiltration concentrate in a first scraped heat exchanger;
  (g) adding additives comprising rennet and starter to the mixture obtained in step (f);
  (h) passing the mixture obtained in step (g) to a second scraped heat exchanger, whereby the additives for cheese are uniformly distributed; and
  (i) placing the mixture of step (h) in molds for making cheese.

2. The method of claim 1, wherein the fat is added in the form of an oil-in-water emulsion with a fat content of at least 70%.

3. The method of claim 1, wherein the starter is added as a concentrate of acid-producing bacteria.

4. The method of claim 3, wherein the starter is added in the form of a starter concentrate obtained by ultrafiltration.

* * * * *